(12) United States Patent
Aoki

(10) Patent No.: US 6,234,568 B1
(45) Date of Patent: May 22, 2001

(54) BODY FRAME STRUCTURE FOR VEHICLE

(75) Inventor: Takeshi Aoki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,764

(22) Filed: Nov. 8, 1999

(30) Foreign Application Priority Data

Nov. 13, 1998 (JP) .................................................. 10-323402

(51) Int. Cl.⁷ .................................................. B62D 27/02
(52) U.S. Cl. .................... 296/203.04; 296/204; 296/205; 296/209; 296/29
(58) Field of Search ............... 296/29, 30, 205, 296/209, 204, 203.04

(56) References Cited

U.S. PATENT DOCUMENTS

| | | | |
|---|---|---|---|
| 4,045,075 | * 8/1977 | Pulver | 296/205 |
| 5,362,121 | * 11/1994 | Enning et al. | 296/204 |
| 5,364,128 | * 11/1994 | Ide | 296/204 X |
| 6,010,182 | * 1/2000 | Townsend | 296/203.01 |

FOREIGN PATENT DOCUMENTS

| | | | |
|---|---|---|---|
| 22366 | * of 1896 | (GB) | 296/205 |
| 358183363 | * 10/1983 | (JP) | 296/204 |

* cited by examiner

Primary Examiner—Dennis H. Pedder
(74) Attorney, Agent, or Firm—Sughrue, Mion, Zinn, Macpeak & Seas, PLLC

(57) ABSTRACT

A structure for a vehicle body having an outrigger integrally coupled with a rear end of a side sill, a side end of a rear cross member and a front end of a rear side frame by means of die-cast molding. The structure may also have a support member supporting a rear trailing arm and a side jack up point, wherein the support member and the side jack up point are integrally coupled with the outrigger by means of die-cast molding.

19 Claims, 5 Drawing Sheets

BODY FRAME STRUCTURE FOR VEHICLE

BACKGROUND OF THE INVENTION

1. Field of the Invention

The present invention relates to a vehicle body frame structure made of an aluminum alloy material.

2. Description of the Related Art

An aluminum alloy material has recently been used to form a vehicle body frame structure so as to decrease the weight thereof. However, the aluminum alloy material is not easily spot-welded and is expensive when used to form a monocoque-type vehicle body. Thus, a welded space frame type vehicle frame was made of a hollow material by extrusion molding. In this case, ordinarily, a side sill is located at an elongate position in the side of the floor of the passenger compartment. Further, a rear side frame is located at an elongate position inside the rear wheel. Furthermore, a front end of the rear side frame and a back end of the side sill are connected with a side of a rear cross member. However, in the above case, the coupled locations of the rear side frame with respect to the rear cross member and the side sill are offset from each other in the direction of the width of the vehicle. Therefore, it is necessary to enlarge a cross sectional area of the rear cross member or the side sill so that the kick-up portion not to deform into the passenger compartment if the vehicle experiences a rear end collision. However, if the area is enlarged, the dwelling comfort or ingress/egress ease deteriorates.

SUMMARY OF THE INVENTION

A side end of a rear cross member, a front end of a rear side frame and a back end of a side sill are each integrally coupled with an outrigger by means of die-cast molding so as to reinforce the coupled portion. The coupled portion also has improved rigidity, the amount of which is determined by the thicknesses of the coupled members. Further, by integrating a support member on a rear trailing arm with a side jack up point, the number of members is reduced.

The entire disclosure of each and every foreign patent application from which the benefit of foreign priority has been claimed in the present application is incorporated herein by reference, as if fully set forth.

DETAILED DESCRIPTION OF THE PREFERRED EMBODIMENT

A detailed description will be given of an embodiment of the present invention with reference to the attached drawings.

Figure 1:
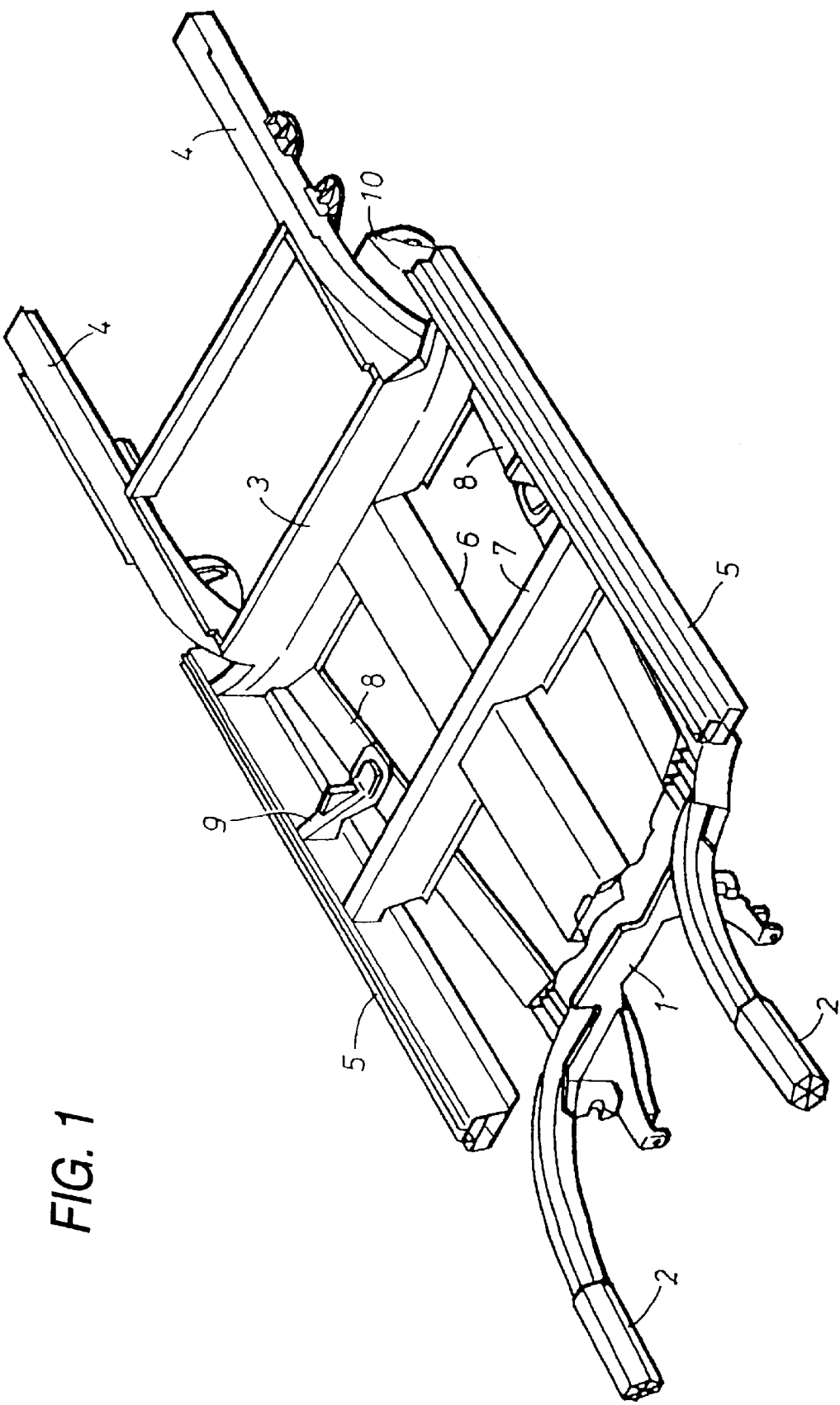
FIG. 1 is an inclined view of the entire lower frame of a vehicle.

FIG. 1 shows the entire lower frame of a vehicle body according to the invention. The frame is constructed by welding various members made of an aluminum alloy. A pair of front side frames 2 that is provided at right and left sides of the vehicle body lower frame is elongated forwardly of the vehicle body, and rear ends of the pair are connected to a dash panel lower cross member 1. A pair of rear side frames 4 provided at right and left sides is elongated rearwardly of the vehicle body, and front ends of the pair are connected to a rear cross member 3. A pair of side sills 5 provided at right and left sides and elongated in a front and rear direction of the vehicle body connects the side ends of the dash panel lower cross member 1 and the rear cross member 3. A floor tunnel 6 is elongated in the front and rear direction of the vehicle body and connects the respective center portions of the dash panel lower cross member 1 and the rear cross member 3. A middle cross member 7 connects the side sills 5 at the respective intermediate positions of the passenger compartment. A pair of nonparallel floor beams 8 having front ends closer to one another than the rear ends, connect connecting portions of the dash panel lower cross member 1 with the front side frame 2 and the side ends of the rear cross member 3. A side rail bracket 9 is provided rearwardly of the middle cross member 7 so as to connect the side sills 5 and the floor beams 8. An outrigger 10 couples with the rear cross member 3, the rear side frame 4, the side sill 5 and the floor beam 8.

The dash panel lower cross member 1, the side rail bracket 9 and the outrigger 10 are die-cast molding. Meanwhile, the other members are made of an extrusion-molding hollow material.

Incidentally, FIG. 1 does not show a floor plate, formed by stamping an aluminum alloy, laid on passenger and luggage compartments.

Figure 2:
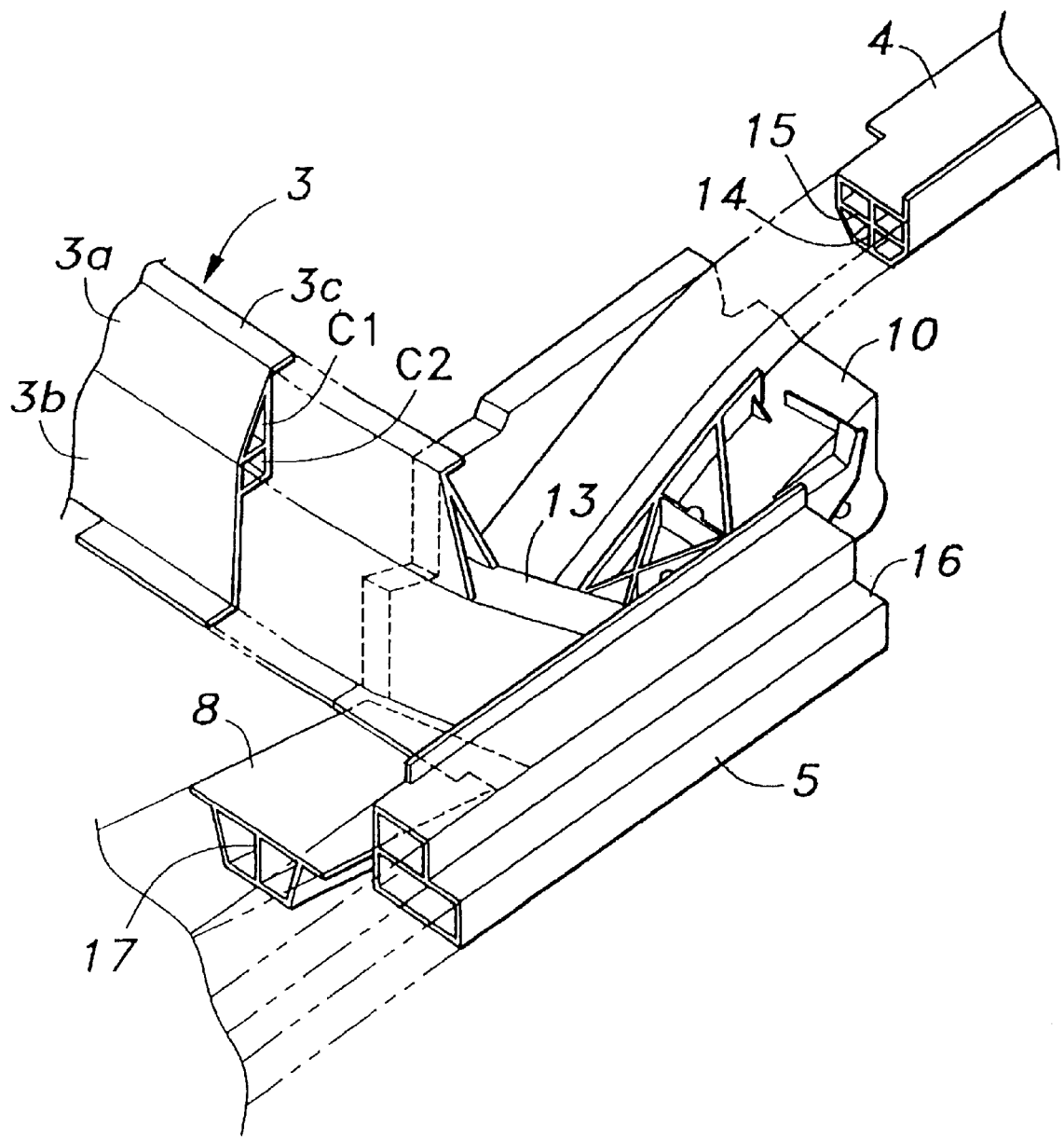
FIG. 2 is an enlarged, inclined view illustrating the state of each of the coupled members according to an outrigger.

As shown in FIG. 2, the rear cross member 3 connected with the rear end of the floor tunnel 6 is formed by an extrusion molding aluminum alloy so as to comprise a first portion 3a, a second portion 3b and an flange 3c. The first portion 3a is formed in a substantially 8-like shape such that two closed cross-sections C1, C2 are vertically piled in a configuration perpendicular to the longitudinal direction of the rear cross member 3. The second portion 3b is formed in a substantially L-like shape in such a manner as to extend downwardly from a front wall of the first portion 3a, and further extend forwardly from a lower ridge portion of the extended wall. The flange 3c is extended from the top of the portion 3a.

Figure 3:
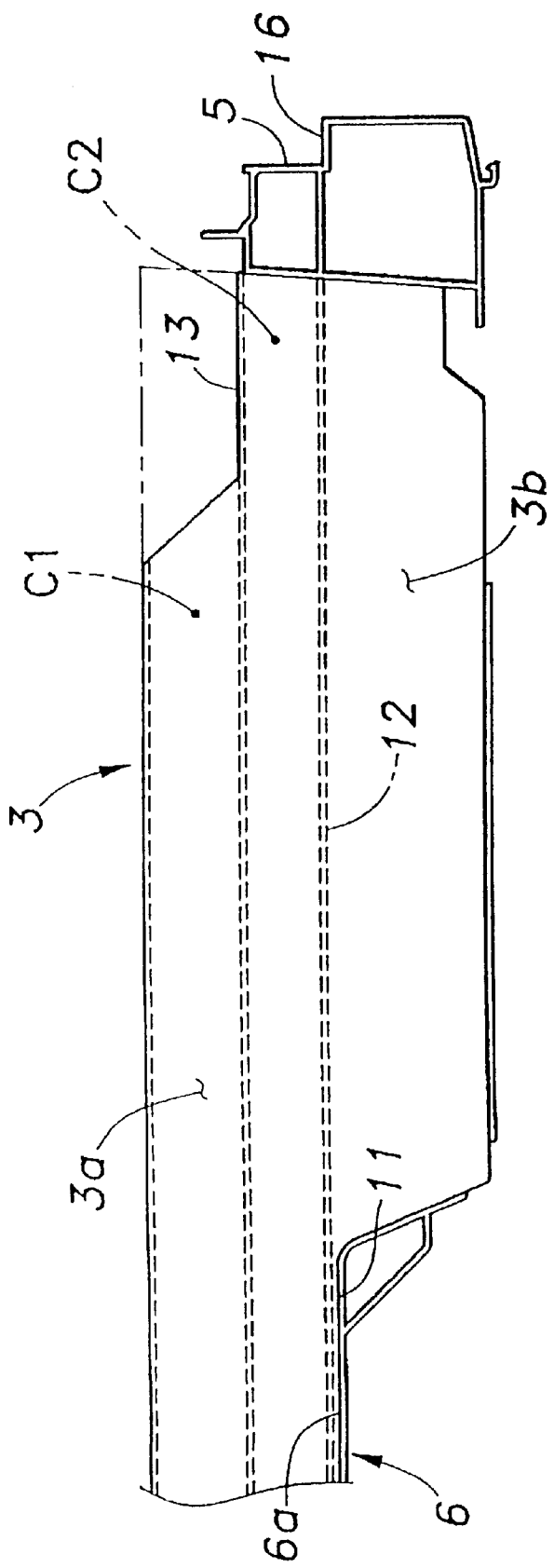
FIG. 3 is a partial cutaway view of the coupled portion of a floor tunnel and a rear cross member.

The center of the second portion 3b of the rear cross member 3, as shown in FIG. 3, forms a cut-out portion 11 to match the outline of the floor tunnel 6. A lower face of a bottom block 12 on the first portion 3a is constructed so as to contact with a top face 6a of the rear end portion of the floor tunnel 6. A cross section of the floor tunnel 6 thus forms a chevron shape comprising flat top face 6a. Further, the contacted portion is welded at the corner thereof so that the center portion of the rear cross member 3 is connected to the rear portion of the floor tunnel 6.

Both side ends of a rear cross member 3 are bent rearwardly. Further, a middle partition 13 closes the two closed cross sections C1, C2 of the first portion 3a. The upper portion thereof is cut off. The connection point of the lower closed cross section C2 and the second portion 3b, as shown in FIG. 3, are welded at the corner into an inside face of side sill 5. Therefore, the rear cross member 3 connects the side sills 5 at right and left sides in such a manner as to extend the entire width of the vehicle.

The rear side frame 4 comprises a longitudinal rib 14, a horizontal rib 15, and a cross section in the longitudinal direction thereof formed in a rectangle-like shape. The two perpendicularly crossed ribs connect the inside faces of the upper, lower, left and right walls of the rear side frame 4. The rear side frame 4 thus has a cross section that looks like a "framed cross".

The longitudinal cross section of the side sill 5 forms an upper and a lower quadrilateral. The lower quadrilateral is larger than the upper one. Further, step portions 16 are arranged on the outside of the side sills 5.

The floor beam 8 has a cross section of an upside down trapezoid, wherein the height is smaller than the width, and the lower side width is smaller than the upper side width. The upper and lower inside walls of the floor beam are connected with a longitudinal rib 17.

Figure 4:
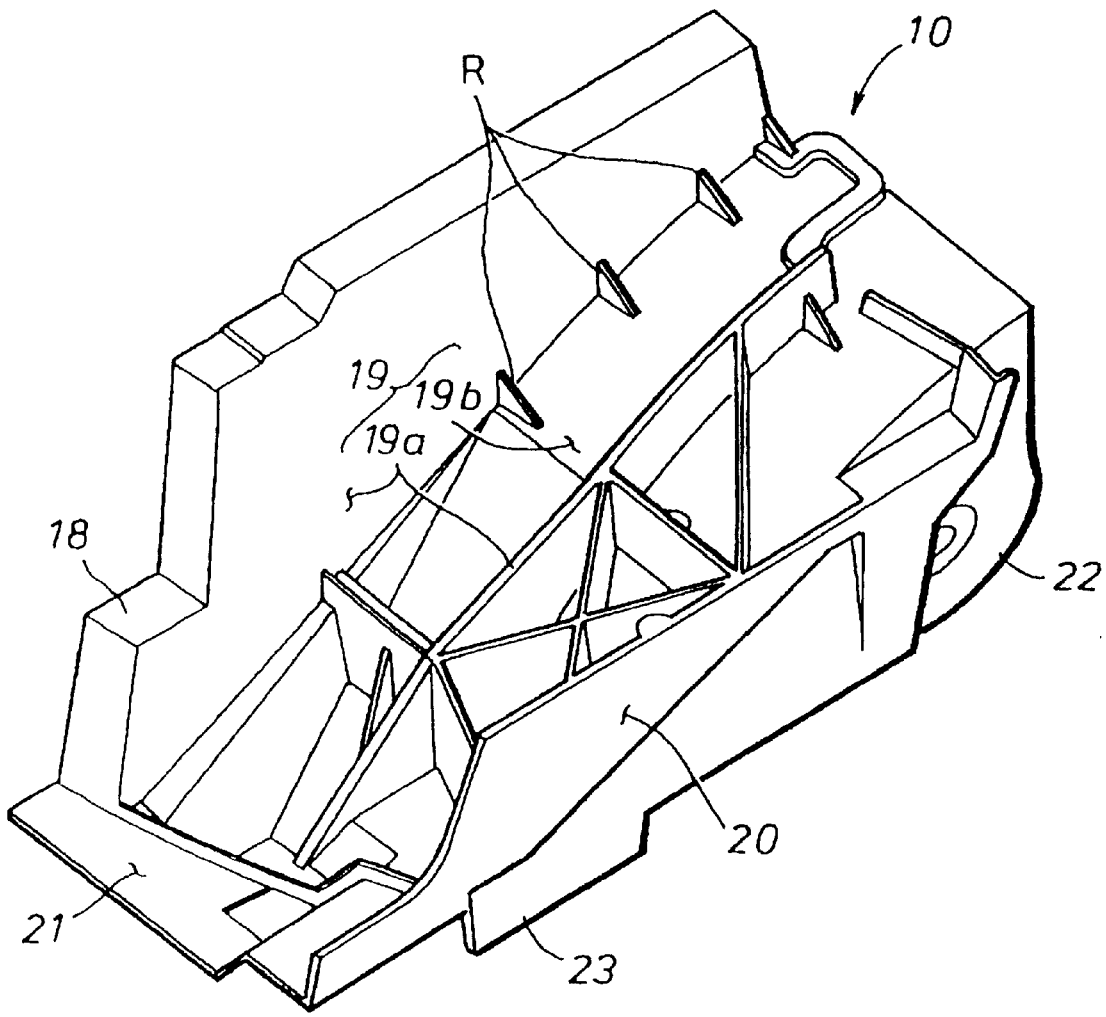
FIG. 4 is an inclined view of an outrigger.

The outrigger 10, which is coupled with the rear cross member 3, the rear side frame 4, the side sill 5 and the floor beam 8, is die-cast molding. Further, as shown in FIG. 4, a rib (provided for convenience) reinforces the outrigger 10.

The outrigger 10 comprises a connected portion 18 of the rear cross member 3 formed in step-like shape so as to couple with an outer surface of the rear and base of the first portion 3a on the side end portion of the rear cross member 3 and an outer surface of the rear end of the second portion 3b. A connected portion 19 of the outrigger 10 comprises a side wall 19a and a bottom wall 19b. The side wall 19a is reinforced by a triangular rib R so as to contact with both outer surface side faces of the front end of the rear side frame 4. The bottom wall 19b is formed in a loose arc-like shape so as to couple with an outer surface bottom face of the front end of the rear side frame 4. A connected portion 20 couples with an outer surface of a side of the rear end of the side sill 5. A connected portion 21 couples with the upper face of the rear end of the floor beam 8. A support member 22 fixes the rear trailing arm 24. The outrigger 10 also has a side jack up point 23. These members integrally form the outrigger 10.

Figure 5:
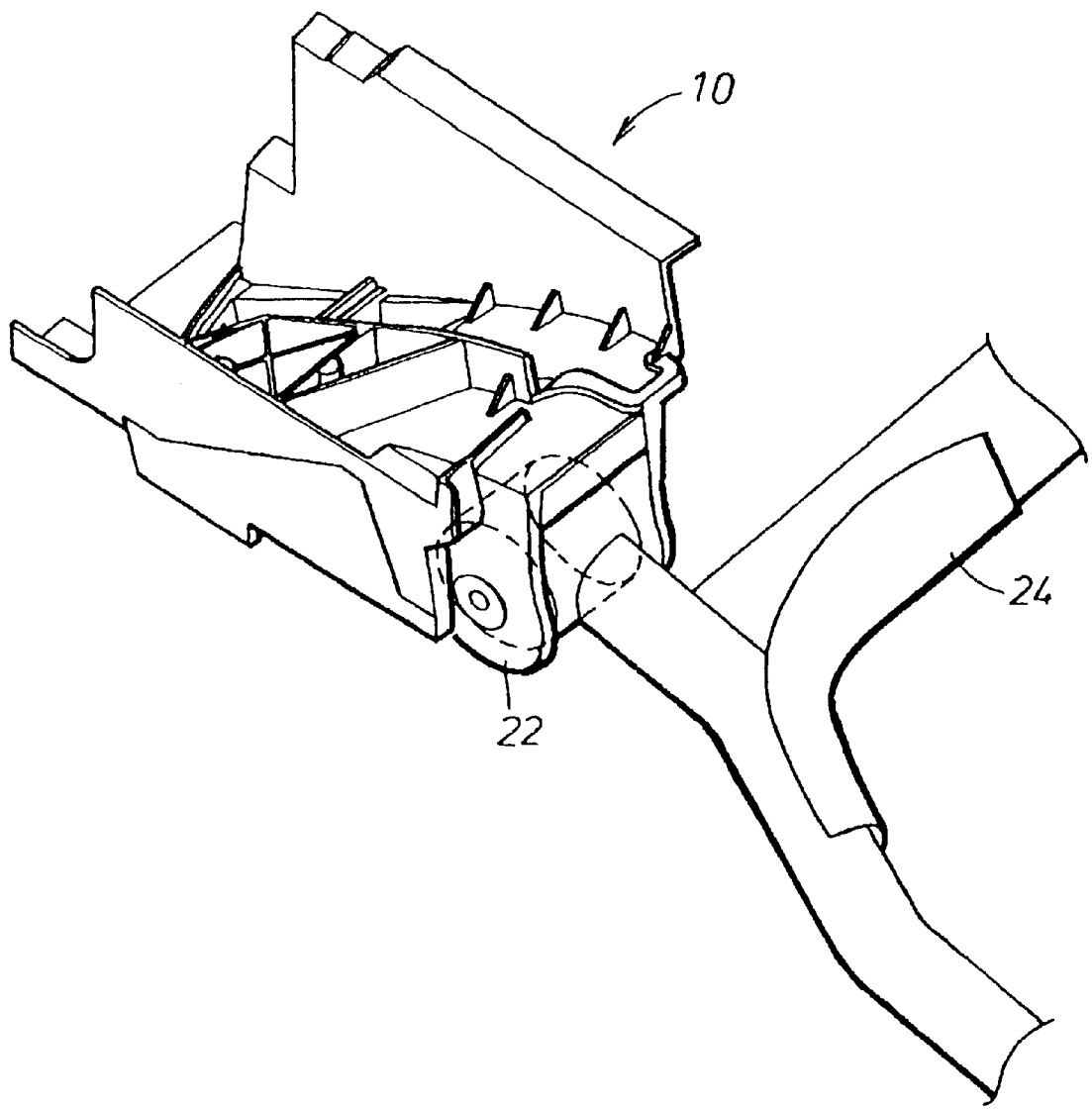
FIG. 5 is an enlarged inclined view illustrating the state of installed a rear trailing arm according to an outrigger.

As shown in FIG. 3, the end portions of the extrusion molding materials of the rear cross member 3, the rear side frame 4, the side sill 5 and the floor beam 8 are welded into the outrigger 10. Further, as shown in FIG. 5, the rear trailing arm 24 is fixed to the support member 22.

According to the present invention as described above, the die-cast molding outrigger 10 improves the rigidity of the kick up portion without expanding the cross section of the side sill 5 or the rear cross member 3, and without increasing the number of members. Further, the outrigger 10 helps to maintain dwelling comfort and ingress/egress ease, and prevents a deformation of the vehicular body due to a collision load from the rear from reaching the passenger compartment. Also, the outrigger improves the rigidity of a supporting portion of the trailing arm 24 so that NVH ability (i.e., sound or vibration ability) can be further improved.

What is claimed is:

1. A vehicle frame structure, comprising:
    a side sill;
    a rear cross member;
    a rear side frame; and
    an outrigger having a plurality of outer connected portions, which are respectively coupled with at least an outer surface rear end portion of said side sill, an outer surface side end portion of said rear cross member and an outer surface front end portion of said rear side frame.

2. The vehicle frame structure according to claim 1, further comprising:
    a support member which supports a rear trailing arm; and
    a side jack up point, wherein said support member and said side jack up point are integrally coupled with said outrigger.

3. The vehicle frame structure according to claim 1, wherein all of said side sill, said rear cross member and said rear side frame are made of an aluminum alloy material.

4. The vehicle frame structure according to claim 2, wherein all of said side sill, said rear cross member, said rear side frame, said support member supporting said rear trailing arm and said side jack up point are made of an aluminum alloy material.

5. The vehicle frame structure according to claim 1, wherein all of said side sill, said rear cross member, and said rear side frame are made of a hollow material.

6. The vehicle frame structure according to claim 2, wherein all of said side sill, said rear cross member and said rear side frame are made of a hollow material.

7. The vehicle frame structure according to claim 1, wherein said rear side frame comprises an angled side wall portion extending in a longitudinal direction.

8. The vehicle frame structure according to claim 7, wherein said outrigger comprises a side wall having a reinforced rib which contacts said angled side wall portion of said rear side frame.

9. The vehicle frame structure according to claim 1, wherein one of said plurality of said outer connected portions is formed to have a step shape so as to couple with a rear and a base portion of said rear cross member.

10. The vehicle frame structure according to claim 1, wherein said outrigger is further coupled with a floor beam.

11. The vehicle frame structure according to claim 10, further comprising a middle cross member which connects said side sill to said floor beam.

12. The vehicle frame structure according to claim 11, where said rear cross member is formed with a cut out portion for receiving said floor beam.

13. The vehicle frame structure according to claim 1, wherein said side sill has an upper quadrilateral and a lower quadrilateral, and wherein said lower quadrilateral is larger than said upper quadrilateral so that a step portion is formed.

14. The vehicle frame structure according to claim 1, wherein an end portion of said rear cross member is bent rearwardly.

15. The vehicle frame structure according to claim 1, wherein said rear side frame comprises a horizontal rib and a vertical rib, both of which extend in a longitudinal direction.

16. The vehicle frame structure according to claim 1, wherein said rear side frame comprises a kick up portion which is inclined upward and toward a back portion of the vehicle, wherein a portion of said kick up portion is coupled to one of said plurality of said outer connected portions.

17. The vehicle frame structure according to claim 1, wherein one of said plurality of outer connected portions of said outrigger has a bottom wall which is formed to have an arc shape so as to couple with a bottom face of the front end of said rear side frame.

18. A vehicle frame structure, comprising:
    a side sill
    a rear cross member;
    a rear side frame having a kick up portion which is inclined upward and toward a back portion of the vehicle; and
    an outrigger including a plurality of outer connected portions, which are respectively coupled with a rear end of said side sill, a side end of said rear cross member, and said kick up portion of said rear side frame.

19. The vehicle frame structure according to claim 18, wherein the outrigger further comprises a support member which supports a rear trailing arm; and
    a side jack up point.

* * * * *